(12) United States Patent
Suzuki (10) Patent No.: US 11,634,015 B1
(45) Date of Patent: Apr. 25, 2023

(54) SUNROOF DEVICE

(71) Applicant: YACHIYO INDUSTRY CO., LTD., Sayama (JP)

(72) Inventor: Ryo Suzuki, Tochigi (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 17/800,463

(22) PCT Filed: Jan. 8, 2021

(86) PCT No.: PCT/JP2021/000556
§ 371 (c)(1),
(2) Date: Aug. 17, 2022

(87) PCT Pub. No.: WO2021/166484
PCT Pub. Date: Aug. 26, 2021

(30) Foreign Application Priority Data

Feb. 18, 2020 (JP) ............................. JP2020-025661

(51) Int. Cl.
*B60J 7/057* (2006.01)
*B60J 7/043* (2006.01)

(52) U.S. Cl.
CPC ............... *B60J 7/057* (2013.01); *B60J 7/043* (2013.01)

(58) Field of Classification Search
CPC ..... B60J 7/05; B60J 7/053; B60J 7/057; B60J 7/0573; B60J 7/043
USPC .................................... 296/221–223, 216.08
See application file for complete search history.

(56) References Cited

U.S. PATENT DOCUMENTS 6,325,453 B1    12/2001  Manders
2003/0151275 A1  8/2003  Ohnishi et al.

FOREIGN PATENT DOCUMENTS

| CN | 206781507 U | 12/2017 | |
| DE | 10024829 A1 * | 5/2001 | ............... B60J 7/05 |
| JP | 2001-047867 A | 2/2001 | |
| JP | 2003-326976 A | 11/2003 | |
| JP | 3704509 B2 | 10/2005 | |
| JP | 2017-159869 A | 9/2017 | |

(Continued)

OTHER PUBLICATIONS

PCT International Search Report and Written Opinion (w/ English translation) for corresponding PCT Application No. PCT/JP2021/000556, dated Mar. 16, 2021, 10 pages.

*Primary Examiner* — Dennis H Redder
(74) *Attorney, Agent, or Firm* — Dority & Manning, PA (57) ABSTRACT

To provide a sunroof device with a simple structure, in which an elastic member can be disposed in a predetermined position accurately and with excellent workability, a sunroof device includes a plate-shaped panel stay having a cam groove on a first side surface and a slider provided with a cam follower pin engaging with the cam groove to cause the movable roof panel to tilt. The slider includes a slider main body having a pin support wall that supports the cam follower pin in a cantilever manner and a contact member mounted to the slider main body so as to slidably contact a second side surface of the panel stay. The contact member includes an extension part opposing a bottom surface of the panel stay, and an elastic member that elastically supports the panel stay when the movable roof panel undergoes opening and closing motion is provided on the extension part.

6 Claims, 10 Drawing Sheets

(56) References Cited

FOREIGN PATENT DOCUMENTS

| | | |
|---|---|---|
| JP | 6475892 B2 | 2/2019 |
| JP | 2019-069702 A | 5/2019 |

* cited by examiner

Fig.6 right(inside) ←——→ left(outside)

SUNROOF DEVICE

CROSS REFERENCE TO RELATED APPLICATIONS

This application is the U.S. National Stage entry of International Application No. PCT/JP2021/000556 filed under the Patent Cooperation Treaty on Jan. 8, 2021, which claims priority to Japanese Patent Application No. 2020-025661 filed on Feb. 18, 2020, both of which are incorporated herein by reference.

TECHNICAL FIELD

The present disclosure relates to a sunroof device, and more specifically relates to a panel support structure of the sunroof device.

BACKGROUND ART

There is known a sunroof device which comprises: a plate-shaped support stay having a movable roof panel mounted to an upper portion thereof; a cam groove formed in a first side surface of the support stay; a cam follower pin that engages with the cam groove to cause the movable roof panel to tilt; and a slider supporting the cam follower pin, wherein the cam follower pin is fixed in a cantilever manner to a pin support part of the slider that opposes the first side surface of the support stay (Patent Document 1). In this sunroof device, the slider includes a contact member that slidably contacts a second side surface of the stay, and the contact member slidably engages with a rail part of the roof guide rail. As the slider slides rearward along the roof guide rail, the movable roof panel tilts down from the closed position and thereafter is stored in the open position between the outer roof panel and the roof lining.

Also, as such an inner slide type sunroof device, there is known a sunroof device in which an elastic member is provided on an upper surface of a bottom portion between a pair of vertical walls of the slider (Patent Document 2). In this sunroof device, a pin that engages with the guide groove of the guide rail when the movable roof panel is tilted down is provided on a rear end portion of the panel stay (support stay) to project therefrom. At the time of opening and closing, the pressing force exerted by the elastic member presses the pin against one surface of the guide groove. Thereby, a gap between the guide groove and the pin is removed.

PRIOR ART DOCUMENT(S)

Patent Document(s)

[Patent Document 1] JP6475892B2
[Patent Document 2] JP3704509B2

SUMMARY OF THE INVENTION

Task to be Accomplished by the Invention

However, in the case where the slider is provided with an elastic member as in the sunroof device described in Patent Document 2, it is necessary to mount the elastic member to a narrow part between the pair of vertical walls of the slider, and the mounting workability of the elastic member is poor. Particularly, in the state in which the panel stay is assembled to the slider, the panel stay is present above the elastic member, and thus, the mounting work of the elastic member is difficult. Also, depending on the structure of the mounting part of the elastic member, there is a risk that the elastic member cannot be disposed accurately.

In view of such background, an object of the present invention is to provide a sunroof device with a simple structure, in which an elastic member can be disposed in a predetermined position accurately and with excellent workability.

Means to Accomplish the Task

To achieve such an object, one embodiment of the present invention provides an inner slide type sunroof device (10) comprising: a movable roof panel (11) for opening and closing an opening (3A) formed in a roof (2) of a vehicle (1); roof guide rails (14) respectively provided along left and right edges of the opening, plate-shaped panel stays (20) respectively mounted on lower surfaces of left and right side portions of the movable roof panel and each having a cam groove (28) on a first side surface (25A); and sliders (22) each provided with a cam follower pin (44) engaging with the cam groove to cause the movable roof panel to tilt and provided in the roof guide rail to be slidable in a fore and aft direction to drive the movable roof panel, wherein a guide pin (26) is provided on a rear end portion of each panel stay to project laterally, the guide pin engaging with the roof guide rail to restrict a vertical position of the movable roof panel when the movable roof panel is tilted down, each slider includes a slider main body (41) having a pin support wall (41B) that supports the cam follower pin in a cantilever manner and a contact member (50) mounted to the slider main body so as to slidably contact a second side surface (25B) of the panel stay opposite to the first side surface, and the contact member includes an extension part (52) opposing a bottom surface of the panel stay, and an elastic member (57) that elastically supports the panel stay when the movable roof panel undergoes opening and closing motion is provided on the extension part.

According to this configuration, since it is possible to dispose the elastic member in the predetermined position by mounting the contact member to the slider main body, the mounting workability of the elastic member is excellent. Also, even in the assembled state in which the cam follower pin of the slider engages with the cam groove of the panel stay, it is possible to easily dispose the elastic member in the predetermined position by mounting the contact member to the slider main body. Further, the elastic member can be accurately disposed with a simple structure in which the contact member configured to be mounted to the slider main body has the extension part.

Preferably, the slider main body includes a bottom wall (41A) extending out from a bottom end of the pin support wall to cross under the panel stay and an opposing wall (41C) that is erected on a free end side of the bottom wall and opposes the pin support wall, and the contact member is mounted to the opposing wall.

According to this configuration, since the contact member is mounted to the opposing wall that opposes the pin support wall, the force acting on the contact member from the panel stay is received by the opposing wall. Therefore, the contact member does not easily fall off from the slider main body.

Preferably, the contact member is detachably secured to the opposing wall in a state in which the slider is slidably provided in the roof guide rail.

According to this configuration, even after assembly of the sunroof device, it is possible to easily dispose/remove the elastic member by attaching/detaching the contact member.

Preferably, the contact member is assembled to the opposing wall from above.

According to this configuration, the contact member which contacts the panel stay to be slidable in the fore and aft direction is prevented from falling off from the opposing wall.

Preferably, the extension part of the contact member supports an intermediate portion of the elastic member in a height direction, and the elastic member is in contact with an upper surface of the bottom wall.

According to this configuration, since the elastic member is in contact with the upper surface of the bottom wall, the reaction force of the pressing force that elastically urges the panel stay upward acts on the slider main body directly. Therefore, it is unnecessary to make the extension part of the contact member have such a high stiffness that allows demonstration of the entire reaction force of the pressing force. Also, because it is unnecessary to make the extension part of the contact member contact the upper surface of the bottom wall, poor engagement of the contact member due to manufacturing error can be avoided.

Preferably, the slider main body consists of a sheet metal member, and a notch (59) is formed in a part of the opposing wall opposing the cam follower pin.

According to this configuration, even though the slider main body has the opposing wall, it is possible dispose a tool in the notch to fix the cam follower pin to the pin support wall.

Effect of the Invention

Thus, according to the present invention, a sunroof device with a simple structure, in which the elastic member can be disposed accurately and with excellent workability, can be provided.

MODE(S) FOR CARRYING OUT THE INVENTION

In the following, an embodiment of the present invention will be described in detail with reference to the drawings. In the following description, front-rear and left-right directions are used with respect to the traveling direction of an automobile 1 provided with a sunroof device 10. Also, an inner side and an outer side of the sunroof device 10 are defined with respect to the lateral direction (vehicle width direction) of the automobile 1.

Figure 1:
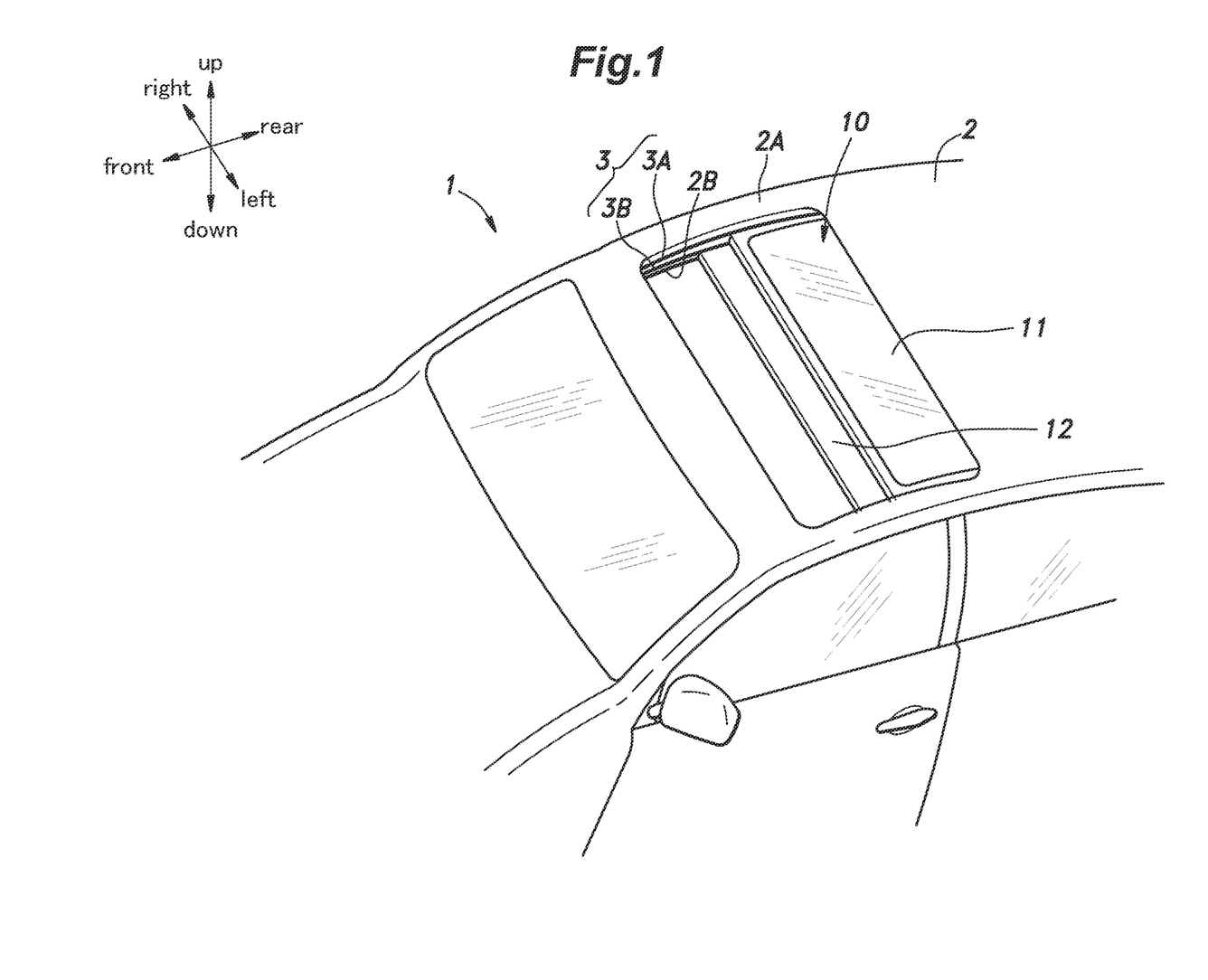
FIG. 1 is a perspective view of a main part of an automobile to which a sunroof device according to an embodiment is applied.

FIG. 1 is a perspective view of a main part of the automobile 1 to which the sunroof device 10 according to the embodiment is applied. As shown in FIG. 1, the sunroof device 10 of an inner slide type is mounted to a roof 2 of the automobile 1. The roof 2 is configured by an outer roof panel 2A on the outer side and a roof lining 2B on the inner side (cabin side). The outer roof panel 2A is formed with a rectangular upper opening 3A, while the roof lining 2B is formed with a rectangular lower opening 3B. The lower opening 3B is slightly smaller than the upper opening 3A and is provided at substantially the same position as the upper opening 3A so as to be included in the upper opening 3A in plan view. The upper opening 3A and the lower opening 3B form an opening hole 3 in the roof 2.

The sunroof device 10 includes a movable roof panel 11 that opens and closes the upper opening 3A of the roof 2 by movement mainly in the fore and aft direction and a shade panel 12 that is disposed to be aligned below the movable roof panel 11 and opens and closes the lower opening 3B by movement in the fore and aft direction.

Figure 2:
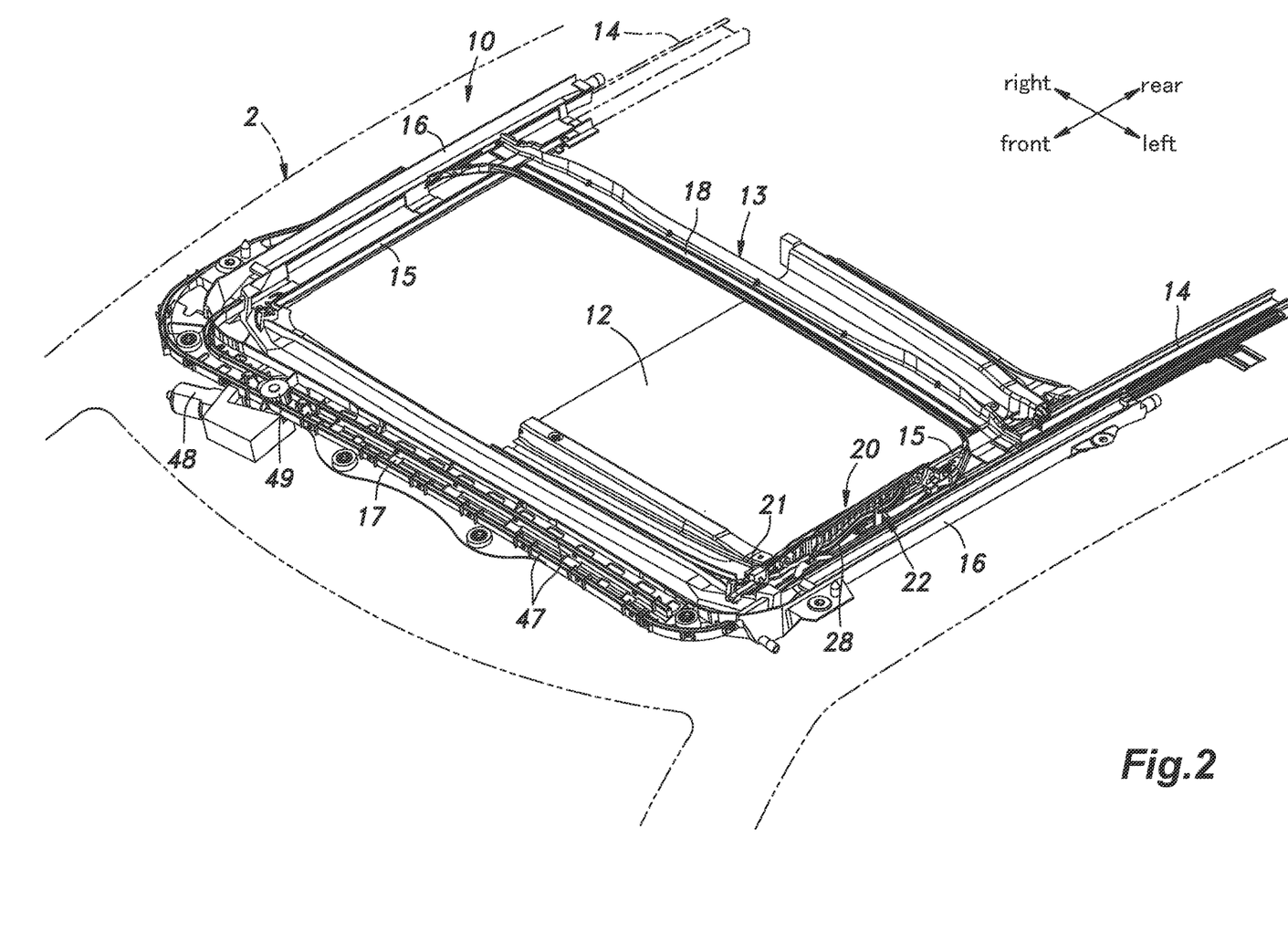
FIG. 2 is a perspective view of the sunroof device shown in FIG. 1.

FIG. 2 is a perspective view of the sunroof device 10 shown in FIG. 1. Note that in FIG. 2, the entirety of the movable roof panel 11, the right half of the shade panel 12, and the right one of later-described roof guide rails 14 are omitted. The movable roof panel 11 and the shade panel 12 are supported by a sunroof frame 13 disposed below the upper opening 3A of the outer roof panel 2A, above the roof lining 2B, and outside the lower opening 3B.

The sunroof frame 13 includes left and right roof guide rails 14 which are made of metal and extend in the fore and aft direction along mutually parallel left and right side edges of the upper opening 3A. On the inner side of the left and right roof guide rails 14, left and right shade guide rails 15 which are made of resin and extend in the fore and aft direction along mutually parallel left and right side edges of the lower opening 3B (see FIG. 1) are disposed. On the outer side of the roof guide rails 14, left and right side drain rails 16 which are made of resin and extend in the fore and aft direction along the mutually parallel left and right edges of the upper opening 3A. On each of left and right sides, the shade guide rail 15 and the side drain rail 16 are integral to each other and hold the roof guide rail 14 on the corresponding side.

The roof guide rails 14 are for supporting the movable roof panel 11 to be movable in the fore and aft direction, and have a fore and aft length twice or more of the fore and aft length of the movable roof panel 11. The roof guide rails 14 extend over the entirety of the upper opening 3A in the fore and aft direction and further extend rearward from the upper opening 3A. The shade guide rails 15 are for supporting the shade panel 12 to be movable in the fore and aft direction, have a fore and aft length greater than the fore and aft length of the shade panel 12, and extend over the entirety of the upper opening 3A in the fore and aft direction.

The sunroof device 10 further includes a front frame 17 made of resin and extending laterally along the front edge of the upper opening 3A such that the both ends thereof are joined to the left and right side drain rails 16 on the corresponding side and a cross frame 18 made of metal and extending laterally along the rear edge of the upper opening 3A such that the both ends thereof are joined to the left and right roof guide rails 14 on the corresponding side, whereby the sunroof device 10 has a rectangular shape.

On the lower surfaces of the both side portions of the movable roof panel 11, left and right plate-shaped panel stays 20 extending in the fore and aft direction are mounted in a depending manner. Each panel stay 20 is supported by the corresponding roof guide rail 14 via a front slider 21 and a rear slider 22, which slidably engage with the roof guide rail 14. The front slider 21 is provided integrally with the corresponding panel stay 20. The rear slider 22 is coupled to the corresponding panel stay 20 via a known cam mechanism to cause the movable roof panel 11 to tilt by moving relative to the panel stay 20 and to cause the movable roof panel 11 to slide in the fore and aft direction by engaging with the panel stay 20. The left and right cam mechanism parts are left-right symmetric to each other. Therefore, in the following, the left cam mechanism part will be described with reference to the drawings.

Figure 3:
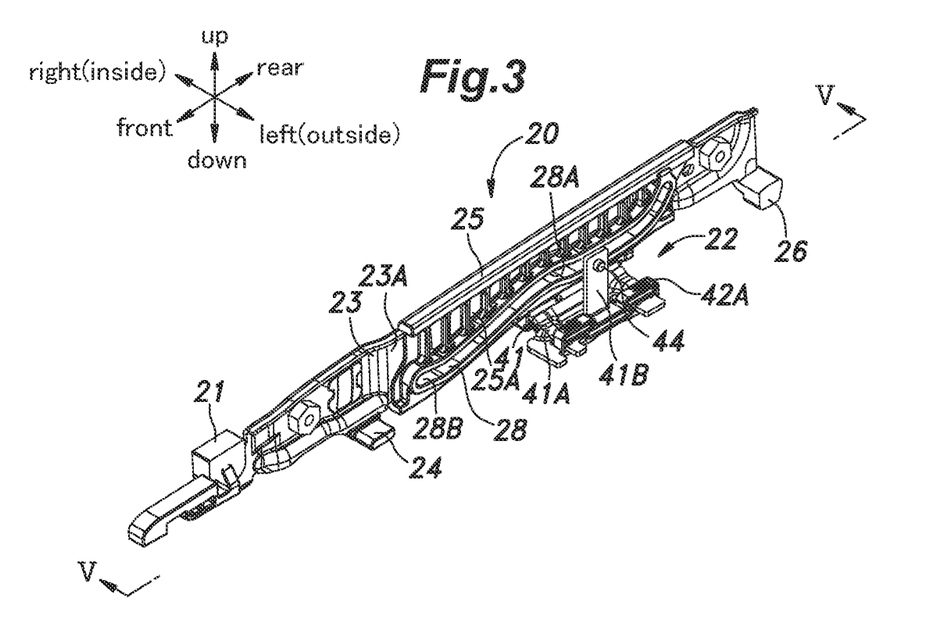
FIG. 3 is a perspective view of a left cam mechanism part shown in FIG. 2 as viewed from outer side.
Figure 4:
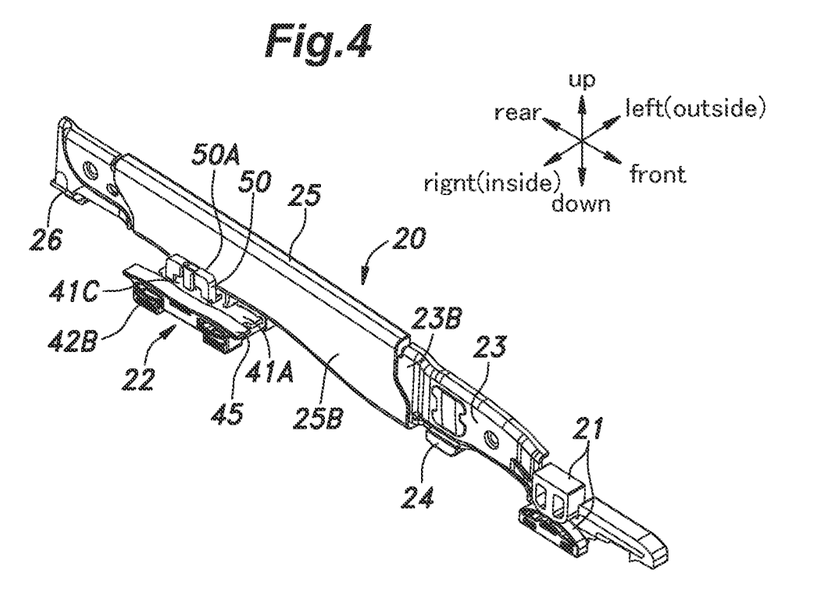
FIG. 4 is a perspective view of the left cam mechanism part shown in FIG. 2 as viewed from inner side.

FIG. 3 is a perspective view of the left cam mechanism part shown in FIG. 2 as viewed from outer side, FIG. 4 is a perspective view of the left cam mechanism part shown in FIG. 2 as viewed from inner side. As shown in FIGS. 3 and 4, the panel stay 20 includes a main member 23 consisting of an elongated metal plate extending in the fore and aft direction. The front slider 21A made of resin and protruding inward is fixed to a front end portion of the main member 23. A front guide pin 24 made of resin and laterally protruding outward and a cam formation member 25 made of resin are fixed to an intermediate portion of the main member 23. A rear guide pin 26 made of resin and laterally protruding outward is provided on a rear end portion of the main member 23. The front slider 21, the front guide pin 24, the cam formation member 25, and the rear guide pin 26 are outsert molded products fixed to the main member 23 by outsert molding.

Figure 5:
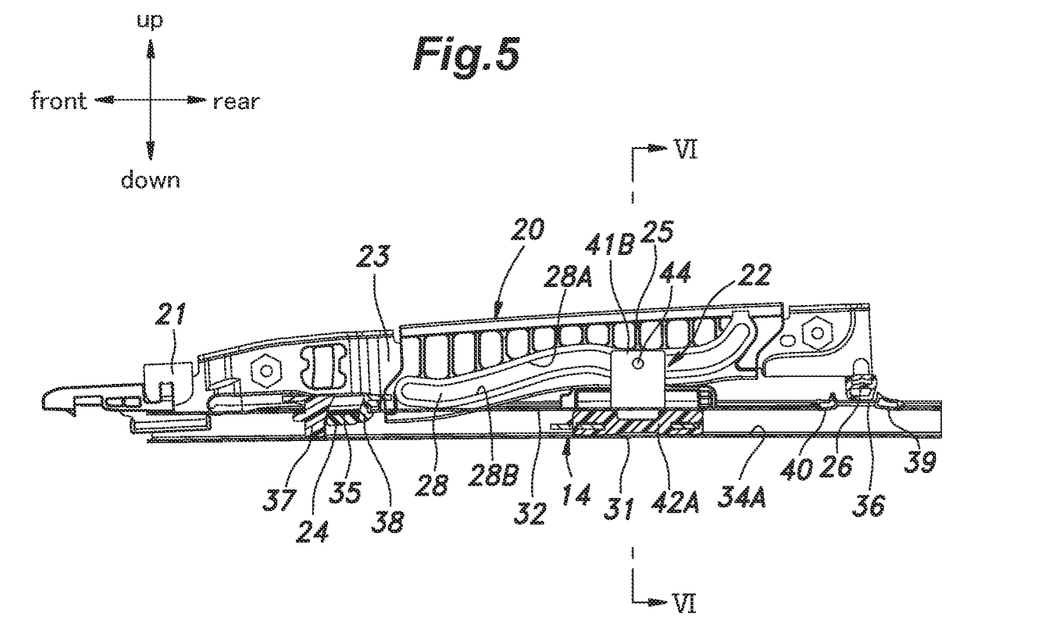
FIG. 5 is a side view of the cam mechanism part along a section line V-V in FIG. 3.
Figure 6:
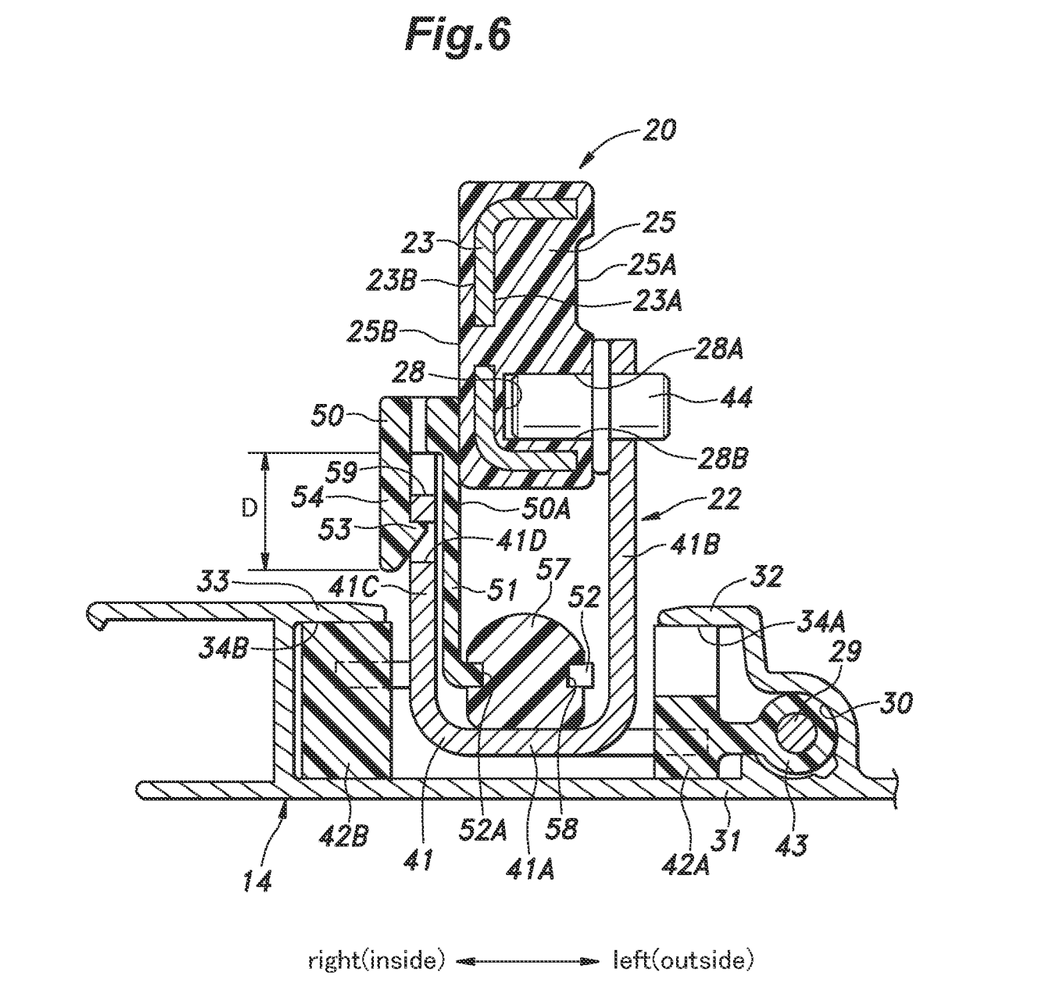
FIG. 6 is a sectional view along line VI-VI in FIG. 5.

FIG. 5 is a side view of the cam mechanism part shown along a section line V-V in FIG. 3, and FIG. 6 is a sectional view taken along line VI-VI in FIG. 5. As shown in FIGS. 5 and 6, the cam formation member 25 is an outsert molded product surrounding the entire circumference of the main member 23 including an outer side surface 23A and an inner side surface 23B and is formed with a cam groove 28 having a waveform shape elongated in the fore and aft direction on an outer side surface 25A thereof. The cam groove 28 forms a bottomed groove that opens outward, with the main member 23 being a bottom wall of the groove, and upper and lower surfaces of the bottomed groove constituting cam surfaces 28A, 28B.

The roof guide rail 14 is a linear member formed as an extrusion molded product of a metal such as an aluminum alloy so as to have a constant cross-sectional shape. As shown in FIG. 6, the roof guide rail 14 has a cable guide hole 30 having a substantially circular cross section and guiding a push-pull cable 29 on the outermost side thereof. A lower wall 31 is provided to be continuous to an inner lower portion of the cable guide hole 30. A first upper wall 32 is provided to be continuous to an inner upper portion of the cable guide hole 30 such that the first upper wall 32 opposes the lower wall 31 via a predetermined vertical space above the lower wall 31. A second upper wall 33 is provided to be continuous to an inner edge side of the lower wall 31 such that the second upper wall 33 opposes the lower wall 31 via a predetermined vertical space above the lower wall 31. The lower wall 31, the first upper wall 32, and the second upper wall 33 are parallel to each other. The lower wall 31 and the first upper wall 32 define a first guide groove 34A that opens inward. The lower wall 31 and the second upper wall 33 define a second guide groove 34B that opens outward.

As shown in FIG. 5, at positions of the first upper wall 32 of the roof guide rail 14 that aligns with the front guide pin 24 and the rear guide pin 26, a front opening and a rear opening 36 are formed. Thereby, the front guide pin 24 and the rear guide pin 26 can enter and exit from the first guide groove 34A by passing through the front opening 35 or the rear opening 36 corresponding thereto.

The front opening 35 is defined by a front first lifting guide member 37 and a front second lifting guide member 38 which are made of resin and guide the lifting up and down of the front guide pin 24. The front first lifting guide member 37 is provided on the first upper wall 32 in front of the front opening 35, and the front second lifting guide member 38 is provided on the first upper wall 32 behind the front opening 35. The front first lifting guide member 37 and the front second lifting guide member 38 are formed as integral molded products and are attached to the first upper wall 32 by being fitted into front notches formed in the first upper wall 32.

The rear opening 36 is defined by a rear first lifting guide member 39 and a rear second lifting guide member 40 which guide the lifting up and down of the rear guide pin 26. The rear first lifting guide member 39 is provided on the first upper wall 32 behind the rear opening 36, and the rear second lifting guide member 40 is provided on the first upper wall 32 in front of the rear opening 36. The rear first lifting guide member 39 and the rear second lifting guide member 40 are respectively integrally molded as components made of resin and having a hollow cross section structure, and are attached to the first upper wall 32 by being fitted into rear notches formed in the first upper wall 32.

As shown in FIG. 4, the front slider 21 engages with the second upper wall 33 to be slidable and tiltable with a pair of arc surfaces sandwiching the second upper wall 33 (FIG. 6) of the roof guide rail 14 from above and below, and serves as a fulcrum for the tilting action of the movable roof panel 11.

As shown in FIG. 6, the rear slider 22 includes a slider main body 41 formed of a sheet metal member. The slider main body 41 includes a bottom wall 41A extending laterally across the panel stay 20 below the same, a pin support wall 41B standing upright from an intermediate portion of the bottom wall 41A in the fore and aft direction so as to oppose the outer side surface 25A of the cam formation member 25, and an opposing wall 41C standing upright from an intermediate portion of the bottom wall 41A in the fore and aft direction at a position more inward than the pin support wall 41B so as to oppose the pin support wall 41B. The bottom wall 41A extends from the bottom end of the pin support wall 41B so as to cross below the panel stay 20, and the opposing wall 41C is erected on the free end side of the bottom wall 41A.

An outer edge of the bottom wall 41A of the rear slider 22 is inserted in the first guide groove 34A, which is defined between the lower wall 31 and the first upper wall 32 of the roof guide rail 14, at a front end and a rear end thereof. To a part of the bottom wall 41A that aligns with the first guide groove 34A, a first engagement member 42A made of resin is mounted so as to be slidable in the roof guide rail 14 along the first guide groove 34A. The first engagement member 42A integrally includes a cable holding part 43 that extends into the cable guide hole 30 and holds the push-pull cable 29.

An inner edge of the bottom wall 41A of the slider main body 41 is inserted in the second guide groove 34B, which is defined between the lower wall 31 and the second upper wall 33 of the roof guide rail 14, at a front end and a rear end thereof. To a part of the bottom wall 41A that aligns with the second guide groove 34B, a second engagement member 42B made of resin is mounted so as to be slidable in the roof guide rail 14 along the second guide groove 34B.

Thereby, the rear slider 22 engages with the roof guide rail 14 at both left and right sides, whereby sliding of the rear slider 22 in the fore and aft direction relative to the roof guide rail 14 is performed stably without causing a skewed displacement (twist).

A cam follower pin 44 made of metal is mounted to the pin support wall 41B. The cam follower pin 44 is a cantilever pin having one end joined to the pin support wall 41B by crimping and protruding from the pin support wall 41B toward the panel stay 20 to slidably engage with the cam surfaces 28A, 28B of the cam groove 28. Note that there is a gap between the other end (tip) of the cam follower pin 44 and the main member 23 constituting the groove bottom wall of the cam groove 28, and the other end of the cam follower pin 44 is not in contact with the main member 23.

A contact member 50 made of resin and provided with a flat outer side surface 50A that slidably contacts (opposes) the inner side surface 25B of the cam formation member 25 is fixed to the opposing wall 41C. Thereby, the rear slider 22 sandwiches the cam formation member 25 from the left and right with the pin support wall 41B and the contact member 50 so as to be movable in the fore and aft direction. The detailed structure of the contact member 50 will be described later.

In the cable guide hole 30 of the roof guide rail 14, a corresponding one of the left and right push-pull cables 29 is passed. Each of the left and right push-pull cables 29 is flexible and has a rear end portion connected (coupled) to the cable holding part 43 of the corresponding rear slider 22. The left and right push-pull cables 29 each extend forward from the cable guide hole 30 and movably engage with front and rear cable guide grooves 47 formed in the front frame 17, as shown in FIG. 2. An electric motor 48 and a pinion 49 rotationally driven by the electric motor 48 are mounted to the front frame 17. The pinion 49 meshes with a helical groove provided on the outer periphery of each of the left and right push-pull cables 29. Thereby, the left and right push-pull cables 29 are driven by the electric motor 48, and the left and right rear sliders 22 move in the fore and aft direction in synchronization by the push-pull cables 29.

Figure 7:
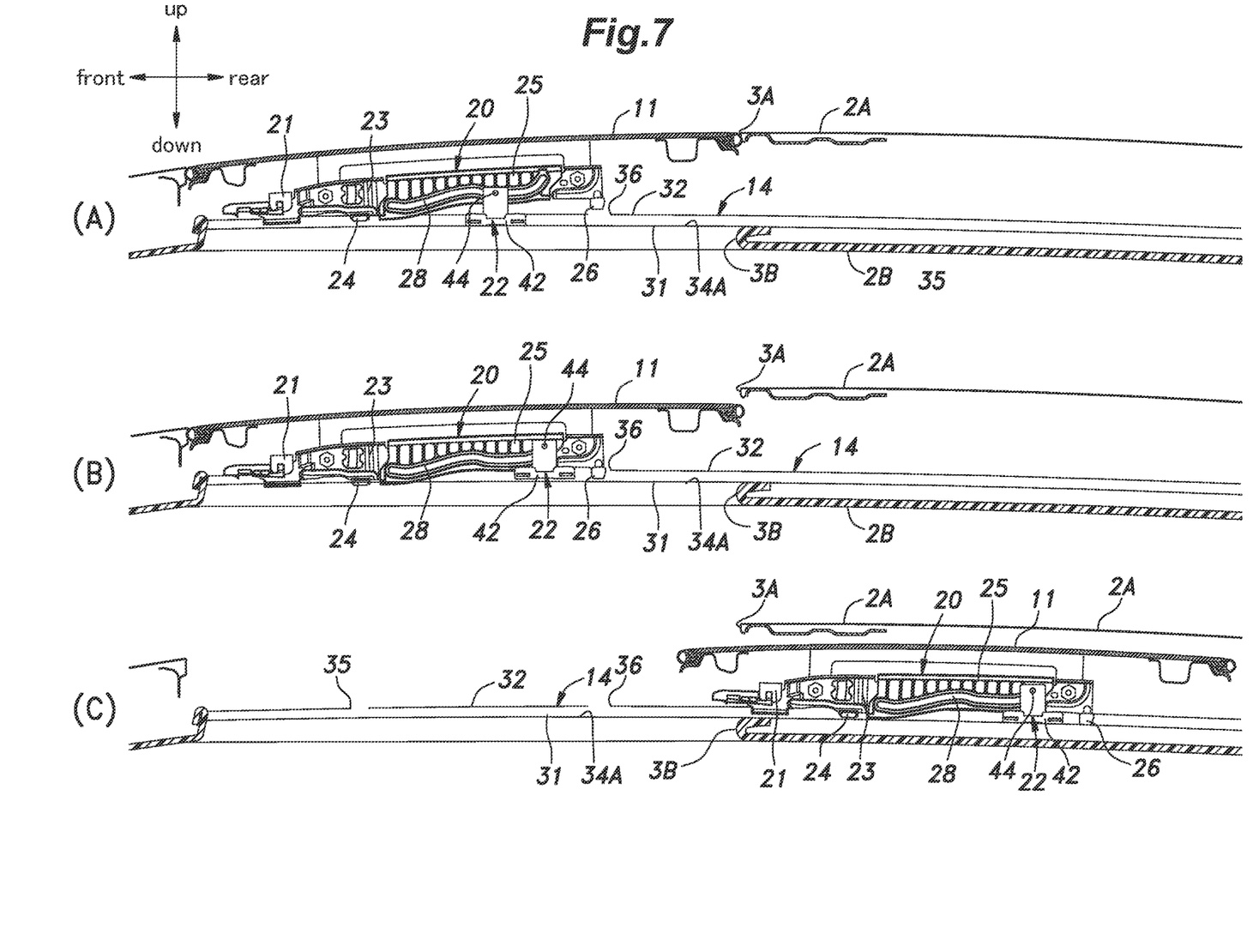
FIG. 7 is an operation explanatory diagram of the sunroof device.

FIG. 7 is an operation explanatory diagram of the sunroof device 10. As shown in FIG. 7(A), in the state in which the movable roof panel 11 is in the closed position, the cam follower pin 44 of the rear slider 22 is positioned in an intermediate portion of the cam groove 28 in the fore and aft direction. When the rear slider 22 is driven forward from this state, the cam follower pin 44 moves forward in the cam groove 28 and the panel stay 20 is tilted to raise the rear portion, with the front slider 21 being a fulcrum. Thereby, though not shown in the drawings, the movable roof panel 11 moves to the tilt-up position in which the rear portion is raised. When the rear slider 22 is driven rearward from this state, the movable roof panel 11 returns to the closed position shown in FIG. 7(A).

In this way, as the panel stay 20 moves along with the sliding of the rear slider 22, the movable roof panel 11 is tilted between the closed position (FIG. 7(A)) and the tilt-up position (not shown in the drawings).

When the rear slider 22 is driven rearward from the state shown in FIG. 7(A), the cam follower pin 44 moves rearward in the cam groove 28, and the panel stay 20 is tilted to lower the rear portion, with the front slider 21 being a fulcrum. Thereby, as shown in FIG. 7(B), the movable roof panel 11 which is tilted together with the panel stay 20 moves to a down position that is lower than the closed position as a whole. At this tilt down, the rear guide pin 26 engages with the roof guide rail 14 to restrict the vertical position of the movable roof panel 11. Further, when the rear slider 22 is driven rearward, the cam follower pin 44 engages with the cam formation member 25 near the rear end of the cam groove 28 and causes the panel stay 20 to integrally slide rearward along the first guide groove 34A. Thereby, the movable roof panel 11 slides rearward below the outer roof panel 2A while keeping the attitude, and moves to the open position to open the upper opening 3A as shown in FIG. 7(C).

Conversely, when the rear slider 22 is driven forward from the state in which the movable roof panel 11 is in the open position as shown in FIG. 7(C), the cam follower pin 44 which engages with the cam formation member 25 near the rear end of the cam groove 28 cause the panel stay 20 to slide forward. Thereby, the movable roof panel 11 slides forward and moves to the down position shown in FIG. 7(B). When the rear slider 22 is further driven forward, the cam follower pin 44 moves forward from near the rear end of the cam groove 28, and the panel stay 20 is tilted to raise the rear portion, with the front slider 21 being a fulcrum. Thereby, the movable roof panel 11 is lifted up to return to the closed position.

In this way, as the panel stay 20 moves along with the sliding of the rear slider 22, the movable roof panel 11 is tilted between the closed position (FIG. 7(A)) and the down position (FIG. 7(B)) and slides between the down position (FIG. 7(B)) and the open position (FIG. 7(B)).

Figure 8:
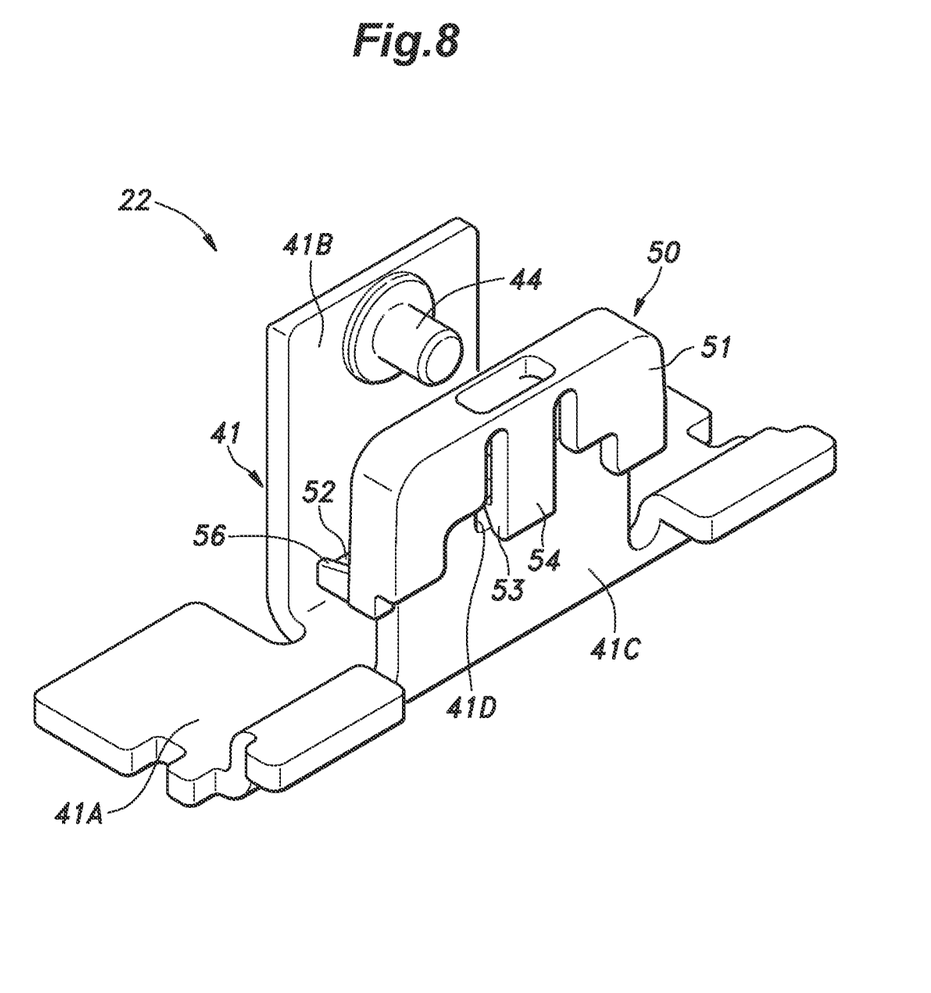
FIG. 8 is a perspective view of a rear slider shown in FIG. 4 (drawing as viewed from rear inner side)
Figure 9:
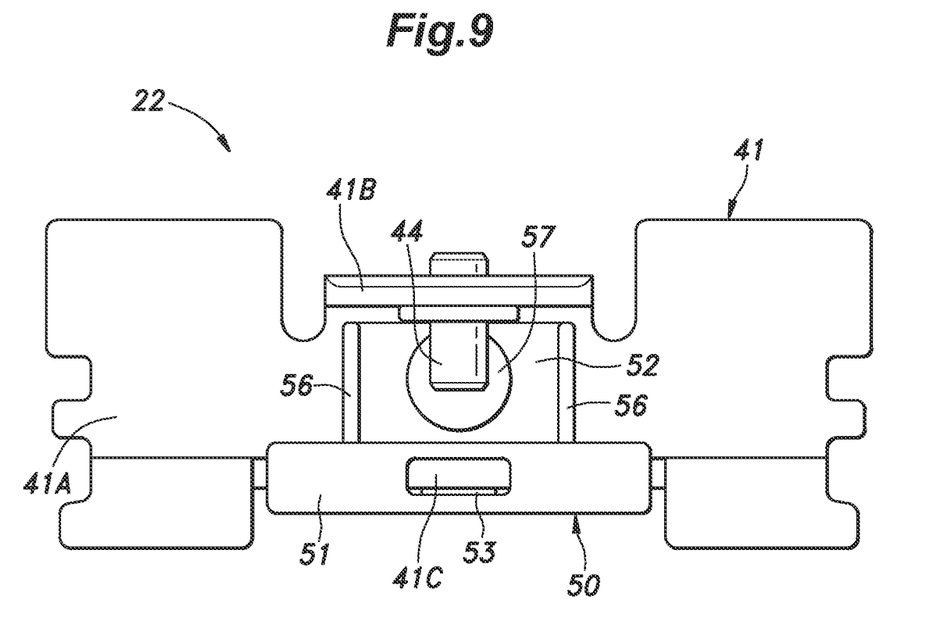
FIG. 9 is a plan view of the rear slider.

Next, description will be made of the contact member 50. FIG. 8 is perspective view of the rear slider 22 shown in FIG. 4 as viewed from rear inner side, and FIG. 9 is a plan view of the rear slider 22. Note that in FIGS. 8 to 10, the first engagement member 42A and the second engagement member 42B are not shown in the drawings. As shown in FIGS. 6, 8, and 9, the contact member 50 is an injection molded product made of resin and includes a main body 51 mounted to the opposing wall 41C and an extension part 52 extending outward from a lower portion of an outer side of the main body 51. The main body 51 is formed with a bottomed hole that opens downward to receive an upper portion of the opposing wall 41C, and is assembled with the opposing wall 41C by being fitted on the opposing wall 41C from above such that the opposing wall 41C of the slider main body 41 is received in the bottomed hole.

A part of an inner wall of the main body 51 extends downward from an upper portion and forms an engagement piece 54 that is formed with a claw 53 at the lower end. The contact member 50 is detachably secured to the opposing wall 41C due to engagement of the claw 53 of the engagement piece 54 with a securing hole 41D (see FIG. 10) formed in the opposing wall 41C when the main body 51 is fitted over the opposing wall 41C of the slider main body 41 from above.

The extension part 52 extends laterally and in the fore and aft direction above the bottom wall 41A of the slider main body 41 and opposes the bottom surface of the panel stay 20. The front and rear edges of the extension part 52 are provided with a pair of reinforcement ribs 56 which extend vertically to the extension part 52 with the main body 51. An intermediate portion of the extension part 52 in the fore and aft direction is formed with a vertically extending through hole 52A (FIG. 6), and an elastic member 57 made of an elastomer such as rubber and having elasticity is inserted in this through hole 52A to be detachably mounted to the extension part 52. The through hole 52A is substantially circular and the elastic member 57 is circular in plan view. In the present embodiment, the through hole 52A is continuous with a free end edge of the extension part 52 via a slit and is formed in a notch shape like a letter Q.

As shown in FIG. 6, an upper surface of the elastic member 57 has a dome shape. The elastic member 57 has a constricted part 58 formed of an annular groove at an intermediate portion of the outer circumferential surface in a height direction, and is supported by the extension part 52 with the constricted part 58 being engaged with the periphery of the through hole 52A. In the state in which the elastic member is supported by the extension part 52, the lower surface of the elastic member 57 contacts the upper surface of the bottom wall 41A. When the movable roof panel 11 is tilted down, the bottom surface of the panel stay 20 contacts the upper surface of the elastic member 57 and the elastic member 57 elastically deforms to apply an upward elastic force on the panel stay 20. Thereby, when the movable roof panel 11 undergoes an opening and closing motion, the panel stay 20 is elastically supported by the elastic member 57 and the rear guide pin 26 is pushed against the lower surface of the first upper wall 32, whereby rattling of the rear guide pin 26 is suppressed.

As described above, since the extension part 52 supports the intermediate portion of the elastic member 57 in the height direction and the elastic member 57 is in contact with the upper surface of the bottom wall 41A, the reaction force of the pressing force that elastically urges the panel stay 20 upward directly acts on the slider main body 41. Therefore, the extension part 52 of the contact member 50 does not need to have such a high stiffness that enables demonstration of the entire reaction force of the pressing force. Also, since the extension part 52 of the contact member 50 does not contact the upper surface of the bottom wall 41A, poor engagement of the contact member 50 by the claw 53 due to manufacturing error can be avoided.

Figure 10:
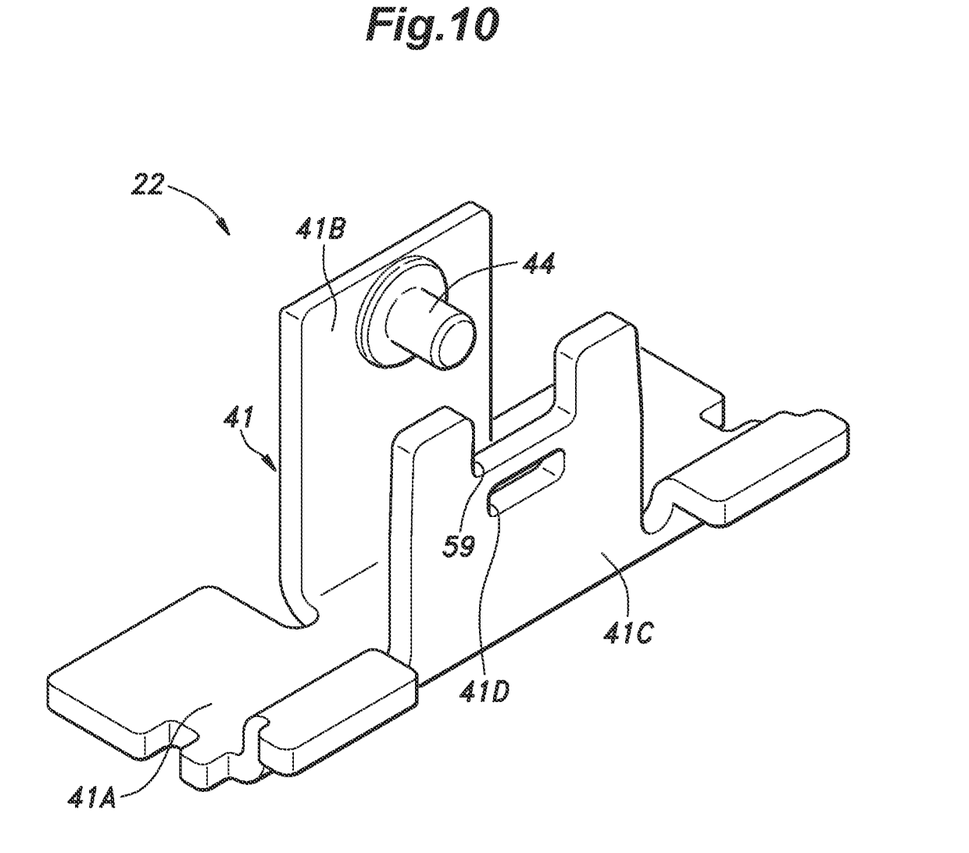
FIG. 10 is a perspective view of the rear slider with the contact member removed.

FIG. 10 is a perspective view of the rear slider 22 with the contact member 50 removed. As shown in FIG. 10, an upper edge of the opposing wall 41C of the slider main body 41 is formed with a notch 59. The notch 59 is formed in a part of the opposing wall 41C opposing the cam follower pin 44. Thereby, even though the slider main body 41 constituted of a sheet metal member has the opposing wall 41C, it is possible to dispose a tool in the notch 59 to fix the cam follower pin 44 to the pin support wall 41B. In other words, the opposing wall 41C extends from the bottom wall 41A to a position higher than the cam follower pin 44 and supports the contact member 50 from inside at the height at which the panel stay 20 contacts the contact member 50 when the movable roof panel 11 is in the closed position.

In the state in which the movable roof panel 11 is in the closed position, as shown in FIG. 6, a gap larger than the depth (the dimension D in FIG. 6) of the bottomed hole formed in the main body 51 of the contact member 50 is provided between the bottom surface of the panel stay 20 and the elastic member 57. Therefore, in the state in which the rear slider 22 is slidably provided in the roof guide rail 14, it is possible to mount the contact member 50 to the opposing wall 41C or remove the contact member 50 from the opposing wall 41C together with the elastic member 57. Thus, the contact member 50 is detachably secured to the opposing wall 41C in the state in which the rear slider 22 is slidably provided in the roof guide rail 14. Thereby, even after assembly of the sunroof device 10, it is possible to easily dispose/remove the elastic member 57 by attaching/detaching the contact member 50.

As described above, in the present embodiment, the contact member 50 includes the extension part 52 opposing the bottom surface of the panel stay 20, and the elastic member 57 that elastically supports the panel stay 20 when the movable roof panel 11 undergoes opening and closing motion is provided on the extension part 52. Therefore, it is possible to dispose the elastic member 57 in the predetermined position by mounting the contact member 50 to the slider main body 41, and the mounting workability of the elastic member 57 is excellent. Also, even in the assembled state of the panel stay 20 in which the cam follower pin 44 of the rear slider 22 engages with the cam groove 28, it is possible to easily dispose the elastic member 57 in the predetermined position by mounting the contact member 50 to the slider main body 41. Further, the elastic member 57 can be accurately disposed with a simple structure in which the contact member 50 configured to be mounted to the slider main body 41 has the extension part 52.

As described above, since the contact member 50 is mounted to the opposing wall 41C, the force acting on the contact member 50 from the panel stay 20 is received by the opposing wall 41C. Therefore, the contact member 50 does not easily fall off from the slider main body 41.

Also, since the contact member 50 is assembled to the opposing wall 41C from above, the contact member 50 which contacts the panel stay 20 to be slidable in the fore and aft direction is prevented from falling off from the opposing wall 41C.

A concrete embodiment of the present invention has been described in the foregoing, but the present invention is not limited to the above embodiment and may be modified or altered in various ways. For example, in the above embodiment, description was made by taking the sunroof device 10 for the automobile 1 as an example, but the present invention may be widely applied to sunroof devices for railroad vehicles and the like. Also, in the above embodiment, the sunroof device 10 is provided such that the movable roof panel 11 opens the opening by moving rearward with respect to the automobile 1, but the sunroof device 10 may be provided such that the movable roof panel 11 moves forward or laterally with respect to the automobile 1. In this case, forward or lateral direction of the automobile 1 coincides with the rearward direction of the sunroof device 10. Besides, the concrete structure, arrangement, number, angle, material, etc. of each member or part may be appropriately changed within the scope of the present invention. Also, not all of the components shown in the above embodiment are necessarily indispensable and they may be selectively adopted as appropriate.

LIST OF REFERENCE NUMERALS 1 automobile
2 roof
3A upper opening
10 sunroof device
11 movable roof panel
14 roof guide rail
20 panel stay
22 rear slider
cam formation member
25A outer side surface (first side surface)
25B inner side surface (second side surface)
26 rear guide pin
28 cam groove 41 slider main body
41A bottom wall
41B pin support wall
41C opposing wall
44 cam follower pin
50 contact member
51 main body
52 extension part
53 claw
54 engagement piece
57 elastic member
59 notch

The invention claimed is:

1. An inner slide type sunroof device comprising:
a movable roof panel for opening and closing an opening formed in a roof of a vehicle;
roof guide rails respectively provided along left and right edges of the opening;
plate-shaped panel stays respectively mounted on lower surfaces of left and right side portions of the movable roof panel and each having a cam groove on a first side surface; and
sliders each provided with a cam follower pin engaging with the cam groove to cause the movable roof panel to tilt and provided in the roof guide rail to be slidable in a fore and aft direction to drive the movable roof panel,
wherein a guide pin is provided on a rear end portion of each panel stay to project laterally, the guide pin engaging with the roof guide rail to restrict a vertical position of the movable roof panel when the movable roof panel is tilted down,
each slider includes a slider main body having a pin support wall that supports the cam follower pin in a cantilever manner and a contact member mounted to the slider main body so as to slidably contact a second side surface of the panel stay opposite to the first side surface, and
the contact member includes an extension part opposing a bottom surface of the panel stay, and an elastic member that elastically supports the panel stay when the movable roof panel undergoes opening and closing motion is provided on the extension part.

2. The sunroof device according to claim 1, wherein the slider main body includes a bottom wall extending out from a bottom end of the pin support wall to cross under the panel stay and an opposing wall that is erected on a free end side of the bottom wall and opposes the pin support wall, and
the contact member is mounted to the opposing wall.

3. The sunroof device according to claim 2, wherein the contact member is detachably secured to the opposing wall in a state in which the slider is slidably provided in the roof guide rail.

4. The sunroof device according to claim 3, wherein the contact member is assembled to the opposing wall from above.

5. The sunroof device according to claim 2, wherein the extension part of the contact member supports an intermediate portion of the elastic member in a height direction, and the elastic member is in contact with an upper surface of the bottom wall.

6. The sunroof device according to claim 2, wherein the slider main body consists of a sheet metal member, and a notch is formed in a part of the opposing wall opposing the cam follower pin.

\* \* \* \* \*